Sept. 17, 1957 M. I. ZELDMAN 2,806,571
ROTARY MOTION STORAGE DEVICE
Filed April 13, 1955 2 Sheets-Sheet 1

INVENTOR.
MAURICE I. ZELDMAN
BY
ATTORNEY

Sept. 17, 1957  M. I. ZELDMAN  2,806,571
ROTARY MOTION STORAGE DEVICE
Filed April 13, 1955  2 Sheets-Sheet 2
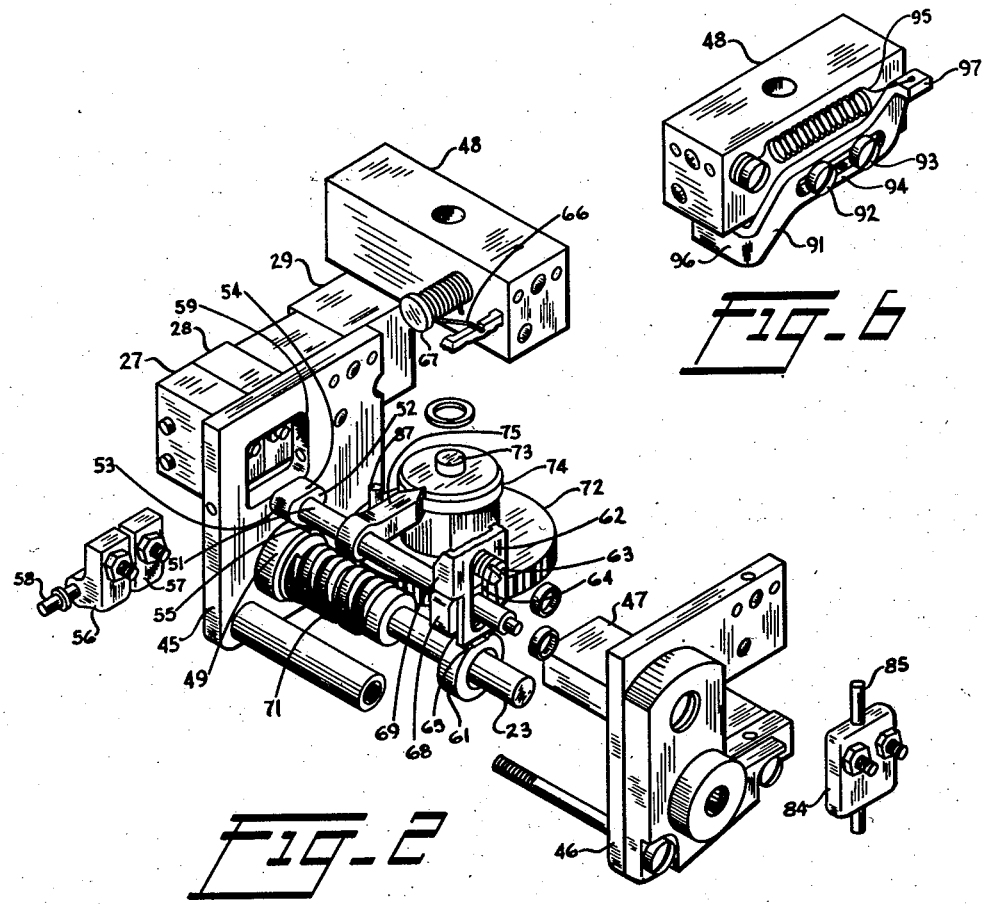
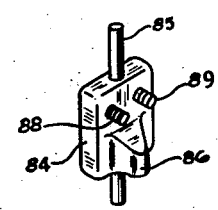
INVENTOR.
MAURICE I. ZELDMAN
BY
ATTORNEY United States Patent Office 2,806,571
Patented Sept. 17, 1957

2,806,571

ROTARY MOTION STORAGE DEVICE

Maurice I. Zeldman, Jackson Heights, N. Y., assignor to General Precision Laboratory Incorporated, a corporation of New York Application April 13, 1955, Serial No. 501,076

9 Claims. (Cl. 192—142)

This invention relates to a device for temporarily storing rotary motion and for subsequently feeding back the exact amount of motion received.

It is frequently desirable to provide a revolution counter or other similar totalizing device which continuously displays the cumulative angular displacement of an input shaft or similar source of input information. At the same time it has also been found desirable to interrupt the operation of the totalizer to enter corrections or for other purposes without at the same time interrupting the flow of input information applied during this period. In such instances the input information must be stored in a device which accepts such information only during the time the totalizer ceases its normal operation and this stored information must be fed into the totalizer when its operation is resumed so that a correct and accurate cumulative total is recorded and displayed.

An object of this invention is to provide a device for storing angular motion and for subsequently delivering the precise amount of motion stored.

Another object of this invention is to provide apparatus for diverting input shaft revolutions from a load device to a storage device and for subsequently transmitting both the current input shaft revolutions and the stored revolutions to the load device.

The invention will be described with the aid of the accompanying drawing in which:

Figure 2 is an exploded view of the mechanical storage unit;

Figure 5 is a view of the rotatable plate taken to show that side which is away from the observer in Fig. 2; and Figure 6 is a view of the operating mechanism for one of the switches.

Figure 1:
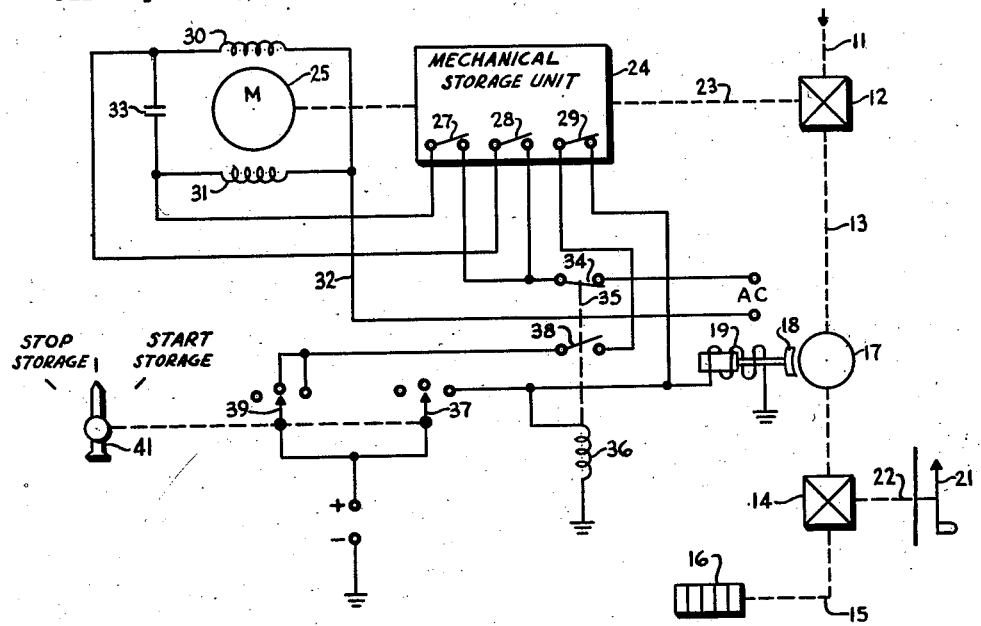
Figure 1 is a schematic diagram of the invention including the electrical connections for controlling the apparatus.

Referring first to Fig. 1, there is shown an input shaft 11 which is the source of input revolutions to be counted. The revolutions of shaft 11 are passed through a mechanical differential 12 to a shaft 13 and through a second mechanical differential 14 to a shaft 15 which operates a totalizing device or revolution counter 16. In normal operation the revolutions of shaft 11 are transmitted directly to the totalizer 16 and the third shafts of each of the differentials 12 and 14 remain stationary. It may be required to stop the operation of totalizer 16 temporarily for any of several reasons, for example, so that computations can be made and corrections inserted. The shaft 13 carries a brake drum 17 arranged to cooperate with a brake shoe 18 operated by a solenoid having a winding 19 which, when energized, urges the brake shoe 18 against the drum 17 thereby stopping the shaft 13. After the computations have been made, corrections may be inserted by means of a handwheel 21 the shaft 22 of which is connected to the third shaft of the differential 14. When the shaft 13 is stopped the revolutions of shaft 11 are transmitted through differential 12 to a shaft 23 connected thereto which in turn operates a mechanical storage unit 24. A reversible motor 25 is also connected to the shaft 23 and when information is being fed into the unit 24 from the shaft 11, the motor 25 is deenergized and merely turns freely. When the revolutions accumulated in unit 24 are to be fed back to the totalizer 16, the winding 19 is deenergized thereby releasing the shaft 13, and the motor 25 is energized so as to turn shaft 23 in the opposite direction thereby feeding the accumulated revolutions through the differential 12 to the shaft 13 while at the same time allowing the current information from shaft 11 also to be fed to the shaft 13. When the precise number of revolutions orginially received by the unit 24 has been returned, the motor 25 is deenergized and the shaft 23 is stopped in the precise position at which it started.

The mechanical storage unit 24 will be fully described in connection with remaining figures of the drawing but for present purposes it will be sufficient to note its effect on the electrical circuits. The unit 24 is provided with three switches 27, 28 and 29 which are preferably of the short-throw or micrometer type. When the shaft 23 is in its normal or reference position, that is, when no information is stored in the unit, the switches 27 and 28 are open while the switch 29 is closed, all as shown in the drawing. As soon as the shaft 23 begins to turn, either switch 27 or switch 28 is closed depending upon the direction of the rotation of shaft 23. The switch 29 remains closed until the device has reached its storage capacity at which time it is opened. The motor 25 is shown as a two phase induction motor having two windings 30 and 31 having a common terminal connected by means of a conductor 32 to one terminal of a source of alternating current. The other terminals of the windings 30 and 31 are bridged by capacitor 33 and are connected respectively to one terminal of switches 28 and 27. The other terminals of the switches 28 and 27 are connected together and, through the normally closed contacts 34 of a relay 35, to the other terminal of the source of alternating current. The relay 35 is operated by a winding 36 one terminal of which is grounded and the other terminal of which is connected to the first contact of a three position switch 37. The second and third contacts of the switch 37 have no connection, and the armature of the switch is connected to one terminal of a source of control power, the other terminal of which is grounded. The brake winding 19 is connected in parallel with the relay winding 36. The first contact of switch 37 is also connected through the normally closed switch 29 and through the normally open contacts 38 of the relay 35 to the first and second contacts of another three position switch 39. The third contact of the switch 39 has no connection and the armature is also connected to the source of control power. The switches 37 and 39 are mechanically connected together and are operated by means of a handle 41 which is spring biased to return to its neutral position as shown in the drawing.

In normal operation, the revolutions of shaft 11 are transmitted directly to the totalizer 16. When it is required to stop the totalizer 16 and to store the revolutions of shaft 11, the handle 41 is moved momentarily to the right, to the position marked "Start Storage." Control power will then flow through the switch 37 to the winding 19 thereby applying the brake and also to the winding 36 thereby picking up the relay 35. The winding 36 will be sealed in through the normally closed switch 29, the now closed contacts 38, and the switch 39. The contacts 34 will be opened by the energization of winding 36 thereby removing the source of alternating current, As soon as the shaft 23 starts to turn, one or the other of switches 27 or 28 will be closed thereby setting up the connections so that motor 25 will run so as to turn shaft 23 in the opposite direction when it is energized. When it is desired to discontinue the storage operation and to feed the stored revolutions into counter 16, the handle 41 is turned in the opposite direction to the position marked "Stop Storage." This will break the circuit the winding 19 thereby releasing the brake shoe 18 and will also break the circuit to the relay winding 36 causing it to drop out and close contacts 34. The motor 25 will now be energized through whichever of switches 27 and 28 is closed and will drive the shaft 23 back to its initial position at which point the switch 27 or 28, as the case may be, will be opened. The precise centering of the shaft 23 is accomplished mechanically as will be more fully explained so that the operation of switches 27 and 28 is not critical.

Referring now to Fig. 2, the elements of the storage unit are supported by two frame members 45 and 46 joined together by two additional members 47 and 48. The shaft 23 is journalled in the frame members 45 and 46 and carries a cam 49 having a single detent. Another shaft 51 is also journalled in frame members 45 and 46 and is arranged parallel to the shaft 23. The shaft 51 carries a cam 52 having shoulder portions 53 and 54 and a finger 55 which, when the shafts are in their reference position, engages the detent of the cam 49. A pair of levers 56 and 57 are pivoted about a shaft 58 which is supported in a recess 59 in the frame member 45. The two micrometer switches 27 and 28 are mounted on the back side of frame member 45 and have their actuating pins projecting into the recess. It can be seen from the drawing that if the shaft 51 rotates one or the other shoulder portions 53 or 54 will be raised depending upon the direction of the rotation of the shaft 51. The levers 56 and 57 are so placed in the recess 59 that the raising of one of the shoulder portions will rotate the corresponding lever 56 or 57 so as to actuate the corresponding micrometer switches 27 or 28.

The shaft 23 also carries a cam 61 having a very broad detent formed in the surface. The cam 61 might also be thought of as having two lobes. A sliding member 62 is supported by the shaft 51 and a bolt 63 both of which pass through a slot 64 in the member 62. The member 62 has a flat straight edge portion 65 resting on the two lobes of the cam 61 to which position it is urged by a torsion spring 66. The spring 66 is supported on a bolt 67 which in turn is mounted on the frame member 48. This arrangement of the cam 61, the slidable member 62 and the spring 66 acts to urge shaft 23 to the precise reference position shown in the drawing.

The shaft 51 also carries a rectangular cam 68 which cooperates with two turned-over shoulder portions of the slidable member 62, one of which is shown at 69. When the shafts 23 and 51 are in their reference positions there is a little clearance between the cam 68 and the turned-over shoulders of the member 62, but when shaft 51 rotates, the rectangular cam 68 engages one of the turned-over shoulder portions, such as 69, so as to raise sliding member 62.

Figures 3, 4:
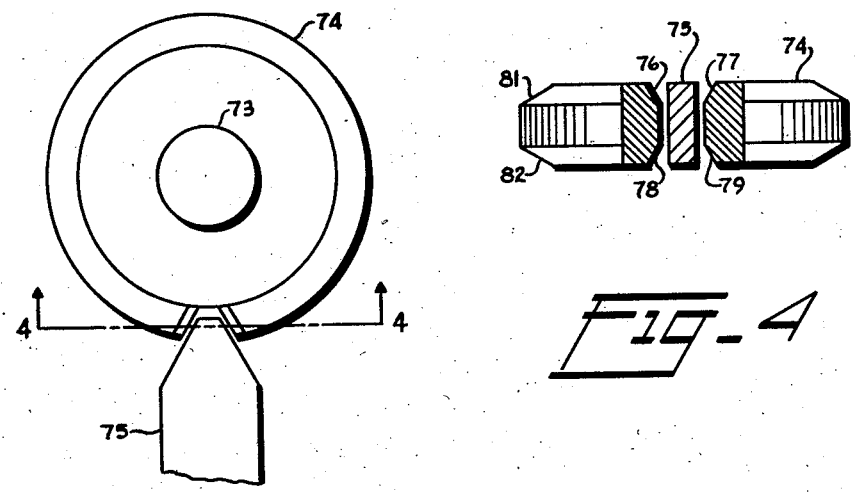
Figure 3 is a plan view of the locking ring and the lever cooperating therewith.
Figure 4 is a sectional view taken on the line 4—4 of Fig. 3.

The shaft 23 also carries a worm gear 71 which engages a worm wheel 72 which wheel is carried by a shaft 73 at right angles to the shafts 23 and 51. The shaft 73 also carries a locking ring 74 having a single detent which cooperates with a lever 75 which is fastened to the shaft 51. As shown more clearly in Figs. 3 and 4, the detent of the locking ring 74 is formed with cam surfaces 76, 77, 78 and 79 while the entire locking ring is formed with sloping surfaces 81 and 82 for purposes which will be more fully explained.

Returning to Fig. 2, a plate 84 is mounted on a small shaft 85 and is placed in a cut away portion of the frame member 46. The lower portion of the plate 84 carries a cam portion 86 (best shown in Fig. 5) which faces the worm wheel 72. The worm wheel 72 carries a pin 87 which will bear against the cam portion 86 when the worm wheel 72 has been turned through approximately 180° in either direction from the position shown in the drawing. The upper portion of the plate 84 carries two screws 88 and 89 for the purpose of actuating the micrometer switch 29 through a mechanism about to be described.

As shown in Fig. 6, the frame member 48 carries a slidable lever 91 by means of two screws 92 and 93 which are fastened to the member 48 and project through a slot 94 in the member 91. The member 91 is biased by means of a tension spring 95 so that its downward extending portion 96 is urged against the screws 88 and 89 of the plate 84. It can be seen that if the plate 84 is rotated about the shaft 85, one or the other of the screws 88 or 89 will bear against the lower extending portion 96 of the slider 91 and slide it longitudinally in the direction of the frame member 45. The opposite end 97 of the slider 91 is arranged to actuate the switch 29 when the member 91 is moved against the action of the spring 95.

*Operation*

When there is no information stored in the mechanical unit 24, all the parts will be in the positions shown in Fig. 2. When it is desired to start the storage process, the handle 41 (Fig. 1) is actuated as previously explained. This starts the angular displacements of shaft 11 flowing to shaft 23. Let it be assumed that the shaft 23 rotates counterclockwise as viewed in Fig. 2. The first thing that happens is that the cam 49 turns, causing the finger 55 to be displaced thereby raising the shoulder portion 53 and starting to rotate shaft 51. This initial rotation of shaft 23 must be made against the action of spring 66 which bears on the slidable member 62 which in turn bears upon the cam 61.

The worm gear 71 and the worm wheel 72 constitute a very low gear ratio so that the shaft 73 turns very slowly compared to the shaft 51. Also, the rectangular cam 68 does not bear at once on the shoulder 69 of the slidable member 62 because of the clearance between these members previously mentioned. As the shoulder portion 53 of the cam 52 rises, the lever 56 will be pivoted about the shaft 58 so as to actuate the micrometer switch 27. As the shaft 51 continues to turn, the shaft 73 will be rotated clockwise as viewed from above and the lever 75 will be lowered somewhat, but will not entirely clear the detent in the locking ring 74. The lever 75 will, however, be lowered sufficiently so that the cam surface 79 (best shown in Fig. 4) will bear against the lever 75 and force it out of the detent of the locking ring. When the lever 75 is forced out, shaft 51 rotates further. This further rotation of shaft 51 will raise the finger portion 55 clear of the cam 49 and will also cause the rectangular cam 68 to engage the folded-over shoulder portion 69 of the sliding member 62 thereby raising the member 62 against the action of the spring 66 until its edge 65 completely clears the cam 61. The lever 75 will now be riding on the surface 82 (Fig. 4) of the locking ring 74 and will be urged into intimate contact therewith by the spring 66. The revolutions of shaft 23 will now be accumulated at a reduced ratio in the shaft 73 and the worm wheel 72.

As explained in connection with Fig. 1, the storage operation may be terminated by the actuation of the handle 41. If handle 41 is not actuated then the device will continue to store the revolutions of shaft 23 until the pin 87 on the gear wheel 72 makes contact with the cam portion 86 (Fig. 5) of the plate 84 which contact will rotate the plate 84 causing the screw 88 to bear against the extended portion 96 (Fig. 6) of the slidable member 91 thereby causing the end portion 97 to actuate the switch 29. As explained in connection with Fig. 1, the actuation of the switch 29 will also terminate the storage operation and energize the motor to drive the shaft 23 in the opposite direction. As the shafts all approach their reference position the lever 75 will be urged by the spring 66 to enter the detent in the locking ring thereby rotating the shaft 51. The rotation of shaft 51 will then actuate switch 27 to deenergize the motor and will also allow the slidable member 62 to engage the cam 61 and bring the shaft 23 to precisely the position from which it started. Since the action of the slidable member 62 and the cam 61 centers the shaft 23 precisely by mechanical means, the precise moment in the cycle when the switch 27 is deenergized is not critical.

The operation of the device has been described for counterclockwise rotation of shaft 23, but it is apparent that an analogous sequence of events would take place if the shaft 23 were rotated in a clockwise direction.

It will be noted that the shaft 23 is biased in its reference position by the action of spring 66, sliding member 62 and cam 61. The initial torque required to rotate the shaft 23 is therefore greater than that required after the member 62 has been raised to clear the cam 61. This is an advantage in the system shown in Fig. 1, since no clutching or braking of shaft 23 is required. The torque required to operate the counter 16 is quite small so that when shaft 13 is free, the rotations of shaft 11 will all be transmitted to shaft 13, and shaft 23 will not rotate. Only when shaft 13 is restrained will the shaft 23 be driven by the shaft 11.

Although a specific embodiment has been described, many modifications within the scope of the invention will occur to those skilled in the art.

What is claimed is:

1. Apparatus for receiving rotary motion as an input and for subsequently delivering as an output the precise number of revolutions received comprising, a shaft for receiving the input revolutions and for delivering the output revolutions, means for establishing a reference position for said shaft, means normally operative for biasing said shaft toward said reference position, means responsive to rotation of said shaft for rendering said biasing means ineffective, a motor for rotating said shaft toward said reference position, means responsive to a predetermined number of revolutions of said shaft for energizing said motor, manually operable means for energizing said motor and means responsive to the approach of said shaft to said reference position for deenergizing said motor and for rendering said biasing means effective.

2. Apparatus for receiving rotary motion as an input and for subsequently delivering as an output the precise number of revolutions received comprising, a shaft for receiving the input revolutions and for delivering the output revolutions, means for establishing a reference position for said shaft, means normally operative for biasing said shaft toward said reference position, a motor connected to said shaft, first means responsive to initial rotation of said shaft for rendering said biasing means ineffective, second means responsive to initial rotation of said shaft for establishing either a forward or a reverse circuit, depending upon the direction of shaft rotation, so that said motor when energized will rotate in a direction determined by the direction of initial rotation of said shaft, means for energizing said motor and means responsive to the approach of said shaft to said reference position for deenergizing said motor and for rendering said biasing means effective.

3. Apparatus for receiving rotary motion as an input and for subsequently delivering as an output the precise number of revolutions received comprising, a shaft for receiving the input revolutions and for delivering the output revolutions, means for establishing a reference position for said shaft, means normally operative for biasing said shaft toward said reference position, a motor connected to said shaft, first means responsive to initial rotation of said shaft for rendering said biasing means ineffective, second means responsive to initial rotation of said shaft for establishing either a forward or a reverse circuit, depending upon the direction of shaft rotation, so that said motor when energized will rotate in a direction determined by the direction of initial rotation of said shaft, means for operating a first switch in response to a predetermined number of revolutions of said shaft, a second switch manually operable, means responsive to the operation of either said first or said second switch for energizing said motor, and means responsive to the approach of said shaft to said reference position for deenergizing said motor and for rendering said biasing means effective.

4. Apparatus for receiving rotary motion as an input and for subsequently delivering as an output the precise number of revolutions received, comprising, a first shaft for receiving the input revolutions and for delivering the output revolutions, a worm gear on said first shaft, a second shaft, a worm wheel mounted on said second shaft and engaging said worm gear, means for establishing a reference position for said shafts, means normally operative for biasing said first shaft toward said reference position, means responsive to rotation of said shafts away from said reference position for rendering said biasing means ineffective, a motor connected to said first shaft, means for energizing said motor to rotate said first shaft toward said reference position and means responsive to the approach of said shafts to said reference position for deenergizing said motor and for rendering said biasing means effective.

5. Apparatus for receiving rotary motion as an input and for subsequently delivering as an output the precise number of revolutions received comprising, a first shaft for receiving the input revolutions and for delivering the output revolutions, a worm gear on said first shaft, a second shaft, a worm wheel mounted on said second shaft and engaging said worm gear, a first cam having two lobes on said first shaft, spring means, a slidable arm having one straight edge which is urged by said spring means into contact with both lobes of said cam whereby a reference position of said first shaft is established, means responsive to rotation of said first shaft for overcoming said spring means and moving said arm out of contact with the two lobes of said first cam, a motor connected to said first shaft, means for energizing said motor to rotate said first shaft toward said reference position, and means responsive to the approach of said shafts to said reference position for deenergizing said motor and for re-establishing the effectiveness of said spring means.

6. Motion storage apparatus comprising, a first shaft for receiving angular displacements and for subsequently delivering the precise amount of displacement received, a worm gear on said first shaft, a second shaft, a worm wheel mounted on said second shaft and engaging said worm gear, a first cam having two lobes on said first shaft, spring means, a slidable arm having one straight edge which is urged by said spring means into contact with both lobes of said cam whereby a reference position of said first shaft is established, means responsive to rotation of said first shaft for overcoming said spring means and moving said arm out of contact with the two lobes of said first cam, a second cam having a single detent mounted on said first shaft, a cam follower fastened to a third shaft and having a finger for engaging said detent when said first shaft is in its reference position whereby rotation of said first shaft from its reference position will initiate rotation of said third shaft, a motor connected to said first shaft, a pair of shoulders on said cam follower for operating one or another switch depending upon the direction of rotation of said third shaft for selecting either forward or reverse motor connections, means for energizing said motor to rotate said first shaft toward said reference position and means responsive to the approach of said shafts to said reference position for deenergizing said motor and for re-establishing the effectiveness of said spring means.

7. Motion storage apparatus comprising, a first shaft for receiving angular displacements and for subsequently delivering the precise amount of displacement received, a worm gear on said first shaft, a second shaft, a worm wheel mounted on said second shaft and engaging said worm gear, a first cam having two lobes on said first shaft, spring means, a slidable arm having one straight edge which is urged by said spring means into contact with both lobes of said cam whereby a reference position of said first shaft is established, a second cam having a single detent mounted on said first shaft, a cam follower fastened to a third shaft and having a finger for engaging said detent when said first shaft is in its reference position whereby rotation of said first shaft from its reference position will initiate rotation of said third shaft, a motor connected to said first shaft, a pair of shoulders on said cam follower for operating one or another switch, depending upon the direction of rotation of said third shaft for selecting either forward or reverse motor connections, a pair of shoulders on said slidable arm, a rectangular cam on said third shaft for engaging said shoulders after a predetermined rotation of said third shaft, whereby rotation of said third shaft will cause said slidable arm to be disengaged from said two lobed cam, means for energizing said motor to rotate said first shaft toward said reference position and means responsive to the approach of said shafts to said reference position for deenergizing said motor and for re-establishing the effectiveness of said spring means.

8. Motion storage apparatus comprising, a first shaft for receiving angular displacements and for subsequently delivering the precise amount of displacement received, a worm gear on said first shaft, a second shaft, a worm wheel mounted on said second shaft and engaging said worm gear, a first cam having two lobes on said first shaft, spring means, a slidable arm having one straight edge which is urged by said spring means into contact with both lobes of said cam whereby a reference position of said first shaft is established, a second cam having a single detent mounted on said first shaft, a cam follower fastened to a third shaft and having a finger for engaging said detent when said first shaft is in its reference position whereby rotation of said first shaft from its reference position will initiate rotation of said third shaft, a motor connected to said first shaft, a pair of shoulders on said cam follower for operating one or another switch depending upon the direction of rotation of said third shaft for selecting either forward or reverse motor connections, a pair of shoulders on said slidable arm, a rectangular cam on said third shaft for engaging said shoulders after a predetermined rotation of said third shaft, whereby rotation of said third shaft will cause said slidable arm to be disengaged from said two lobed cam, a locking ring having a single detent on said second shaft, a lever one end of which is fastened to said third shaft and the other end of which engages the detent on said locking ring when all the shafts are at their reference positions, cooperating cam surfaces on the detent of said locking ring and on said lever whereby when said lever is displaced from the center of said detent, rotation of said locking ring will force said lever out of said detent, thereby rotating said third shaft, and means for energizing said motor.

9. Motion storage apparatus comprising, a first shaft for receiving angular displacements and for subsequently delivering the precise amount of displacement received, a worm gear on said first shaft, a second shaft, a worm wheel mounted on said second shaft and engaging said worm gear, a first cam having two lobes on said first shaft, spring means, a slidable arm having one straight edge which is urged by said spring means into contact with both lobes of said cam whereby a reference position of said first shaft is established, a second cam having a single detent mounted on said first shaft, a cam follower fastened to a third shaft and having a finger for engaging said detent when said first shaft is in its reference position whereby rotation of said first shaft from its reference position will initiate rotation of said third shaft, a motor connected to said first shaft, a pair of shoulders on said cam follower for operating one or another switch depending upon the direction of rotation of said third shaft for selecting either forward or reverse motor connections, a pair of shoulders on said slidable arm, a rectangular cam on said third shaft for engaging said shoulders after a predetermined rotation of said third shaft, whereby rotation of said third shaft will cause said slidable arm to be disengaged from said two lobed cam, a locking ring having a single detent on said second shaft, a lever one end of which is fastened to said third shaft and the other end of which engages the detent on said locking ring when all the shafts are at their reference positions, cooperating cam surfaces on the detent of said locking ring and on said lever whereby when said lever is displaced from the center of said detent, rotation of said locking ring will force said lever out of said detent, thereby rotating said third shaft, manually operable means for energizing said motor and limit switch means operable upon a predetermined rotation of said third shaft in either direction for energizing said motor.

References Cited in the file of this patent
UNITED STATES PATENTS

| | | |
|---|---|---|
| 2,118,944 | Purdy | May 31, 1938 |
| 2,528,489 | Bednash et al. | Nov. 7, 1950 |
| 2,633,220 | Chase | Mar. 31, 1953 |
| 2,644,427 | Sedgfield et al. | July 7, 1953 |
| 2,769,941 | Elliott | Nov. 6, 1956 |